(12) United States Patent
Greenwood et al.

(10) Patent No.: US 6,387,173 B2
(45) Date of Patent: May 14, 2002

(54) COMPOSITION AND METHOD TO PREPARE A CONCRETE COMPOSITION

(75) Inventors: Peter Greenwood, Göteborg; Hans Bergqvist, Torslanda; Ulf Skarp, Göteborg, all of (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/855,976

(22) Filed: May 15, 2001

Related U.S. Application Data
(60) Provisional application No. 60/205,394, filed on May 19, 2000.

(30) Foreign Application Priority Data
May 19, 2000 (EP) .............................................. 00850091

(51) Int. Cl.$^7$ ............................................... C04B 24/04
(52) U.S. Cl. ........................ 106/728; 106/737; 106/823
(58) Field of Search ................................. 106/728, 737, 106/823

(56) References Cited

U.S. PATENT DOCUMENTS
| | | | |
|---|---|---|---|
| 5,368,833 A | 11/1994 | Johansson et al. | .......... 423/338 |
| 6,008,275 A | 12/1999 | Moreau et al. | ................. 524/5 |

FOREIGN PATENT DOCUMENTS
| | | |
|---|---|---|
| EP | 692465 | 1/1996 |
| EP | 931030 | 5/2000 |

OTHER PUBLICATIONS
R.K. Iler, The Chemistry of Silica, John Wiley & Sons, Inc., 1979, pp. 406–409.

Primary Examiner—Paul Marcantoni
(74) Attorney, Agent, or Firm—Lainie E. Parker

(57) ABSTRACT

The present invention relates to a concrete composition comprising a hydraulic binder, aggregates, water, silica sol and a superplasticiser being a polycarboxylate. The invention further involves a method for preparation thereof and use of the prepared concrete composition as high fluidity concrete.

12 Claims, No Drawings

COMPOSITION AND METHOD TO PREPARE A CONCRETE COMPOSITION

This application claims benefit of Provisional Application 60/205,394 filed May 19, 2000.

The invention relates to a concrete composition and a method for the preparation thereof. The invention further relates to the use of the prepared concrete composition. The invention especially relates to a highly fluid concrete composition containing a silica sol and a polycarboxylate superplasticiser.

BACKGROUND OF THE INVENTION

Concrete is an artificial material commonly used as a building material, in which aggregates or ballast of suitable sizes are bound together by a matrix of at least one hydraulic binder, which usually is of cement type, e.g. Ordinary Portland Cement. Concrete mixtures may also contain various additives to change the properties of the mixture e.g. to modify setting and hardening conditions, or to modify rheological properties in order to attain a desired workability or fluidity of the mixture.

When a concrete mixture is to be cast, it is necessary that the concrete is maintained in fluid form to keep it workable until the casting moment. It is thus of great importance that the concrete mixture has a certain degree of workability and that it does not start to harden or set in advance. Today's concrete producers and building contractors often face the problem of too short workability time of the concrete. Sometimes, the transport of the concrete from the concrete factories to the building sites takes too long time so that the concrete loses its flowability.

It is a further concern that the cement particles and the aggregates should not segregate. Segregation usually results in an undesirable or even uncastable concrete.

Previous methods to prepare fluid concrete mixtures have involved vibration energy input after placing resulting in expensive installation and operating costs due to indispensible compaction and vibration equipment and extensive need of control personnel. Various attempts have been made to overcome these problems. Rheological modifiers such as cellulose ethers, welan gum, silica fume, and precipitated silica and acrylic copolymer dispersions have been added to concrete mixtures to obtain a vibration-free fluid concrete mixture with sufficient workability. These modifiers, however, have been shown to increase the viscosity of the concrete mixture over time thereby decreasing the workability.

EP-A-0931 030 discloses a concrete mixture comprising aggregates, hydraulic binder, and a silica sol having a specific surface area below 200 m$^2$/g. EP-A-0931 030 aims at improving the compressive strength by providing a silica sol to a concrete mixture wherein the silica sol particles have a relative standard deviation higher than 30%. According to EP-A-0931 030, superplasticisers of e.g. sulphonated naphtalene-formaldehyde resin, sulphonated melamine-formaldehyde resin, or sulphonated melamine-urea-formaldehyde resin may be added to the concrete mixture. These types of superplasticisers only provide improved workability for a very limited period of time far too low to be acceptable under ordinary working conditions as the mixture must be vibrated to keep it in essentially fluid workable form. These conditions are far below the demand of the concrete industry of today, especially for self-compacting concretes.

U.S. Pat. No. 6,008,275 discloses a cementitious mixture comprising low-grade cement, e.g. Ordinary Portland Cement partially replaced with pozzolanic cement containing e.g. fly ash, slag, and natural pozzolans. The cementitious mixture also comprises a polycarboxylate polymer water reducer and an accelerator.

The present invention effectively provides a non-bleeding high fluidity concrete composition, i.e. a concrete that does not require any energy input or only some energy input after placement in moulds, and a method for preparation thereof.

THE INVENTION

According to the present invention, a new concrete composition have been provided in order to solve the above-mentioned problems. The new concrete composition comprises a hydraulic binder, aggregates, water, silica sol and a superplasticiser being a polycarboxylate.

It has been surprisingly noticed that the concrete composition of the present invention can attain a workability time of about 1–2 hours or more, depending on how much silica sol and polycarboxylate superplasticiser is added, essentially without any static bleeding, i.e. without any substantial segregation of cement particles and aggregates or separation of water in the static non-vibrated aqueous concrete mixture. This is due to the combination effect of a polycarboxylate superplasticiser and a preferably aqueous silica sol which together are capable of increasing the workability of the concrete mixture while suppressing bleeding.

By workability time is here meant the time elapsed between the mixing moment of a superplasticiser, in order to increase the workability, with a concrete mixture and the point of time when the workability has decreased to the initial workability level, i.e. before addition of the superplasticiser. Furthermore, it has surprisingly been noticed that the concrete composition according to the present invention also provides an improved compressive strength compared to compositions not containing a polycarboxylate superplasticiser or compositions containing a polycarboxylate but not containing a silica sol. The admixture of both a polycarboxylate and a silica sol improves the compressive strength due to the synergistic effect that arises when the two components are added to the concrete mixture.

The hydraulic binder may be any cement, e.g. Ordinary Portland Cement (OPC), blast furnace slag cement or other classes of cement comprising slag, fly ash or other cements as described in the literature, e.g. U.S. Pat. No. 6,008,275.

Aggregates are preferably composed of stones, gravel and sand, and commonly having an average particle diameter range from about 0.01 to about 100 mm. In this context, mortar, only containing aggregates with a maximal particle size of from about 2 to about 4 mm, e.g. sand, and a hydraulic binder should also be mentioned. For simplicity, mortar is here meant to be incorporated in the term concrete.

The silica sol added to the concrete mixture suitably comprises silica sol particles having an average particle diameter range from about 2 to about 200 nm, preferably from about 3 to about 100 nm. It has been found that silica sol particles effectively prevent bleeding due to their capability of binding water molecules, in contrast to e.g. silica fume which has a hydrophobic action and a low specific surface area. The silica sol particles also provide good adhesion to the cement particles and to the aggregates.

By the term "silica sol" is herein also comprised aluminium-modified silica sols. Aluminium modified silica sols, sometimes also referred to as aluminate modified silica sols, can be prepared by adding an appropriate amount of aluminate ions, $Al(OH)_4^-$, suitably of a diluted sodium or potassium aluminate solution, suitably from about 0.05 to about 2, preferably from about 0.1 to about 2 Al atoms/nm$^2$ surface area of the silica particle, to a conventional non-modified silica sol under agitation and heating. The aluminium-modified silica particles comprise inserted or exchanged aluminate ions, creating aluminosilicate sites having a fixed surface negative charge. The pH of the aluminium-modified silica sol can be adjusted, preferably by means of an ion exchange resin, suitably to a pH ranging from about 3 to about 11, preferably from about 4 to about 10. The aluminium modified silica particles suitably have an $Al_2O_3$ content of from about 0.05 to about 3 wt %, preferably from about 0.1 to about 2 wt %. The procedure of preparing aluminium modified silica sol is further described e.g. in "The Chemistry of Silica", by Iler, K. Ralph, pages 407–409, John Wiley & Sons (1979) and in U.S. Pat. No. 5 368 833.

According to one embodiment of the invention, the silica sol particles of the concrete composition suitably have a specific surface area of from about 50 to about 1200 m$^2$/g, preferably from about 300 to about 1000 m$^2$/g, and most preferably from about 500 to about 900 m$^2$/g. The silica sol particles are preferably anionic and are suitably dispersed in presence of a cations such as $K^+$, $Na^+$, $Li^+$, $NH_4^+$ or the like or mixtures thereof. The pH of the dispersion suitably is from about 2 to about 12, preferably from about 2 to about 3 or from about 7 to about 11. The solid content of silica in the sol suitably is from about 1 to about 70 wt %.

The term polycarboxylate superplasticisers is here meant to comprise a group of polymer compounds comprising a backbone having carboxylic groups linked thereto. The polycarboxylate molecular weight suitably ranges from about 1000 to about 2 000 000 g/mole, preferably from about 2000 to about 1 000 000 g/mole. The backbone can also comprise other linked groups such as polyacrylic or polyether chains. The molecular weight of the backbone suitably is from about 1000 to about 100 000 g/mole, preferably from about 5 000 to about 20 000 g/mole. As an example of a polycarboxylate, an acrylic copolymer with polyethylene glycol chains attached thereto may be illustrated as below:

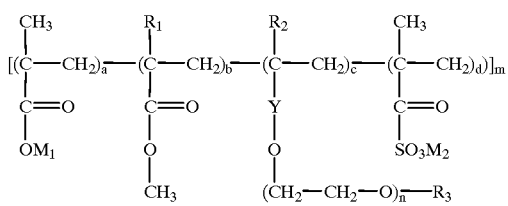

where Y is $CH_2$ or C=O, and $R_1$, $R_2$, $R_3$ are H or $CH_3$ and $M_1$, $M_2$ are Na, K, Li or $NH_4$. The steric stabilisation of the polycarboxylate is dependent on the number of repetitive units n, making up a grafted chain, e.g. $(CH_2-CH_2-O)_n-R_3$, which normally ranges from about 20 to about 1000 units, preferably from about 50 to about 500 units. A high value of n indicates a higher degree of steric stabilisation of the polymer. The grafted chains suitably have a molecular weight of from about 1000 to about 50 000 g/mole, preferably from about 2000 to about 25 000 g/mole. The index a of the backbone group C—$CH_2$ suitably ranges from about 1 to about 500. The indexes b, c and d of the remaining backbone groups, suitably range from about 1 to about 100, while m, being the number of backbone units, suitably ranges from about 1 to about 500, preferably from about 2 to about 100.

The molecular weight ratio between the grafted chains and the backbone chain influences the retardation of the concrete mixture, i.e. the time before setting will occur. The higher the molecular weight ratio, the lower the retardation. The molecular weight ratio between the backbone and the grafted chains suitably is from about 1 to about 100, preferably from about 5 to about 20. Carboxylic and sulphonic groups are suitably linked to the backbone, suitably in the way above illustrated, i.e. directly to the backbone. The molar ratio between the carboxylic and the sulphonic groups suitably is from about 1 to about 10, preferably from about 3 to about 5. The ratio may be varied in order to shorten or prolong the time before setting. Generally, the higher the molar ratio, the longer the retardation time. If the ratio is low, the sulphonic groups may form ettringite, which can suppress the fluidity of the mixture.

According to a preferred embodiment of the invention, the polycarboxylate is selected from table 1. No. 3 of table 1 is the most preferred polymer.

TABLE 1

| No. | n | Backbone $M_w$ (g/mole) | Grafted chains $M_w$ (g/mole) | Total polymer $M_w$ (g/mole) | m | a | b | c | d |
|---|---|---|---|---|---|---|---|---|---|
| 1 | 60–70 | 1000 | 3000 | 4000 | 1 | 8 | 1 | 1 | 1 |
| 2 | 60–70 | 5000 | 18000 | 23000 | 2 | 10 | 3 | 3 | 3 |
| 3 | 60–70 | 5000 | 108000 | 113000 | 12 | 12 | 3 | 3 | 3 |
| 4 | 60–70 | 20000 | 360000 | 380000 | 10 | 50 | 12 | 12 | 12 |
| 5 | 60–70 | 50000 | 225000 | 275000 | 25 | 12 | 3 | 3 | 3 |
| 6 | 60–70 | 100000 | 1500000 | 1600000 | 250 | 6 | 2 | 2 | 2 |
| 7 | 60–70 | 100000 | 1500000 | 1600000 | 500 | 5 | 1 | 1 | 1 |
| 8 | 60–70 | 100000 | 375000 | 475000 | 125 | 4 | 1 | 1 | 1 |

According to yet another preferred embodiment, the polycarboxylates may comprise polyvinyl carboxylate polymers, derivatised with at least one of carboxyl, sulphonate, and phosphonate functional moieties, and additionally containing non-ionic polymer units comprising, or containing mixtures of, hydrophilic ethylene oxide units, and/or hydrophobic propylene oxide units, as side chains. Side chains for the polymers may include alkyl, phenyl, substituted phenyl, sulphonated phenyl, carboxylic acid or salt, sulphonic acid or salt, phosphonic acid or salt, polyoxyalkylene, —$CH_2O$-polyoxyalkylene,—C(O)O-polyoxylalkylene, C(O)NH-polyoxyalkylene, —C(O)NH($CH_n$)$SO_3M$, where M is at least one of H, Li, Na, K, Ca, Mg, $NH_4$, alkylamine and hydroxyalkylamine, and the like or other polycarboxylates as described in U.S. Pat. No. 6,008,275.

The concrete composition suitably comprises a concrete mixture of about 100 parts by weight of hydraulic binder; from about 100 to about 1000, preferably from about 200 to about 500 parts by weight of aggregates; from about 0.01 to about 50, preferably from about 0.01 to about 10 part by dry weight of silica sol; from about 0.01 to about 10, preferably from about 0.01 to about 3 parts by dry weight of polycarboxylate; and from about 20 to about 80, preferably from about 25 to about 60 parts by weight of water.

The water:hydraulic binder ratio of the concrete mixture suitably ranges from about 0.2 to about 1, preferably from about 0.25 to about 0.8.

According to a preferred embodiment, fine filler is comprised in the concrete composition. By the term "fine filler"

is meant particles of a maximum diameter of 125 μm. Suitable fine fillers include limestone, sand, glass, fly ash and other inorganic materials, such as calcium magnesium silicate.

The concrete composition may also comprise various additives, e.g. retarders, air-entraining agents, accelerators, emulsion latex, hydrophobising agents, shrinkage reducing agents etc. The dosages of these additives are normally in the range of 0.1 to 10 wt % dry weight based on the hydraulic binder.

The present invention also involves a method for preparation of a concrete composition as above described. The concrete composition is prepared by mixing aggregates, hydraulic binder, silica sol, and polycarboxylate in any order, before or after addition of water. Suitably, the silica sol, calculated as dry silica, is added in an amount of from about 0.01 to about 50 wt %, preferably from about 0.01 to about 10 wt %, calculated on the weight of the hydraulic binder.

The polycarboxylate, suitably added as an aqueous solution, suitably contains 30 to 40 wt % solid content, may be added, before or after addition of the silica sol, in an amount of from about 0.01 to about 10 wt %, preferably from about 0.01 to about 3 wt % calculated on the weight of hydraulic binder. Further characteristic technical features of the components added are as above described. Further additives, as above enumerated, may also be added to the mixture in prescribed amounts.

According to a preferred embodiment, polycarboxylate and silica sol is added as a premixed suspension to the other components making up the concrete composition. Preferably, the premixed suspension of silica sol and polycarboxylate is added after having mixed the other components.

The present invention also involves the use of a concrete composition, as above described, as high fluidity concrete, as e.g. self-compacting concretes, self-levelling concretes, or underwater concretes. Self-compacting concretes and self-levelling concretes typically involve precast concretes, or ready mixed concretes. The high fluidity concrete involves applications such as industrial flooring, other industrial, residential, commercial or infrastructural applications or the like.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims. The following examples will further illustrate how the described invention may be performed without limiting the scope of it. If not otherwise stated, all parts and percentages refer to parts and percent by weight.

EXAMPLE 1

An aqueous Na-stabilised anionic silica sol having a specific surface area of 900 m$^2$/g dispersed at a concentration of 10 wt % silica was added to a mixture of 3300 g Portland cement, 7575 g sand, 8050 g aggregates of a diameter size of 10–20 mm, 2450 g aggregates of 5–10 mm, and 24.75 g Fosroc Conplast™ SP 500 (a polycarboxylate superplasticiser available from Fosroc Limited). The water:cement weight ratio was 0.45. After mixing, static bleed, workability and workability retention were measured. Static bleed is a measure in percent of the total amount of water contained within the test specimen calculated on the amount of accumulated bleeding water. The workability of the concrete was estimated by measuring the initial spread, i.e. the diameter of a freshly mixed and compacted concrete placed in a slump cone forming a cone-shape concrete mass and then allowed to flow after removal of the cone (according to Standard Test Method ASTM C 143). The higher the spread, the higher the workability. The workability retention was measured in the same way by measuring the spread for a 30 min, 60 min, 90 min, and 120 min old concrete mix.

Yet another admixture was prepared as above described in example 1 except that an anionic silica sol stabilised with Na having a specific surface area of 80 m$^2$/g was added instead of the 900 m$^2$/g silica sol. The silica concentration in the aqueous dispersion was 25 wt %. The results of the two admixtures are set forth in table 2 below.

TABLE 2

| Product | SiO$_2$ dry | Bleed % | Spread mm | Workability retention, mm | | |
|---|---|---|---|---|---|---|
| | | | | 30 min | 60 min | 90 min |
| Control | 0 | 0.5 | 490 | 370 | 340 | 310 |
| Precipitated Silica | 1.25 | 0 | 280 | 250 | 240 | 220 |
| Silica fume | 5 | 0 | 400 | 320 | 270 | |
| Silica fume | 10 | 0 | 320 | 270 | 240 | |
| Silica sol 900 m$^2$/g (10 wt %) | 0.2 | 0 | 310 | 240 | 220 | |
| Silica sol 80 m$^2$/g (25 wt %) | 1.25 | 0 | 320 | 300 | 240 | 230 |

As can be seen in table 2, a smaller amount of silica sol is needed to obtain a level of 0% bleed while essentially maintaining the workability closer to the initial workability level compared to precipitated silica, silica fume and the control sample without any silica addition showing rapidly decreasing workability.

EXAMPLE 2

A mixture was prepared of 1650 g Ordinary Portland Cement, 1650 g of Ground Granulated Blastfurnace Slag, 7575 g sand, 8050 g of 10–20 mm aggregate, 3450 g of 5–10 mm aggregate, a silica sol stabilised with Na with a specific surface area of 900 m$^2$/g containing 10 wt % of silica and 24.75 g superplasticiser "Fosroc Conplast™ SP 500" being a polycarboxylate superplasticiser available from Fosroc Limited. The water:cement weight ratio was 0.45. After mixing, static bleed, workability and workability retention were measured. The samples for compressive strength measurements were cured for one day in steel frames. Later in climate room at 20° C. and 55% RH. The results are set forth in Table 3 below.

EXAMPLE 3

The admixture of example 2 was prepared with an anionic silica sol stabilised with Na having a specific surface area of 80 m$^2$/g instead of the 900 m$^2$/g silica sol. The silica concentration in the aqueous dispersion was 25 wt %. The test were performed as in example 2. The results are set forth in Table 3 below.

TABLE 3

| Product | % SiO$_2$ dry | Bleed % | Spread mm | Workability retention, mm 30 min | 60 min | 90 min | 120 min |
|---|---|---|---|---|---|---|---|
| Silica fume | 5 | traces | 520 | 420 | 370 | 340 | 250 |
| Precipitated Silica | 1.25 | 0 | 340 | 310 | 310 | 270 | 250 |
| Silica sol 900 m$^2$/g | 0.2 | 0 | 360 | 280 | 230 | | |
| Silica sol 80 m$^2$/g | 1.25 | 0 | 560 | 410 | 350 | 350 | 300 |

From table 3, it can be noticed that a small amount of silica sol in the concrete composition is capable of, compared to silica fume and precipitated silica, stopping bleeding without essentially decreasing the workability. It can be especially remarked that a high specific surface area of a silica sol imparts effective bleeding stop even when an extremely small amount is added compared to prior art additives, e.g. precipitated silica and silica fume.

EXAMPLE 4

Portland cement, ¾" limestone, sand, polycarboxylate, CS-300, i.e. an anionic silica sol stabilised with Na having a specific surface area of 300 m$^2$/g and a silica concentration in the aqueous dispersion of 30 wt %, water were mixed as defined in table 4 below. In a comparative example the same components were mixed except for the superplasticiser, which was NFS (Sulphonated naphtalene formaldehyde resin (NFS)). Compressive strength of the concrete compositions was measured as well as the slump being an alternative measure of the workability, calculated by measuring the vertical distance between a cone frustum and a concrete mass having been placed in same cone and allowed to subside (according to Standard Test Method ASTM C 143).

TABLE 4

| Test | 1 (Control) | 2 (Comparative example) | 3 (Control) | 4 |
|---|---|---|---|---|
| Portland cement | 340 kg | 340 kg | 340 kg | 340 kg |
| ¾" limestone | 863 kg | 863 kg | 863 kg | 863 kg |
| Sand | 490 kg | 490 kg | 490 kg | 490 kg |
| Polycarboxylate | — | — | 2 kg | 2 kg |
| Sulphonated naphtalene formaldehyde resin (NFS) | 2.5 kg | 5 kg | — | — |
| CS-300 | — | 17 kg | — | 17 kg |
| Water/cement ratio | 0.35 | 0.35 | 0.35 | 0.35 |
| Slump, cm | 19 | 18 | 23 | 21 |
| 12 h compressive strength, MPa | — | — | 7 | 15 |
| 24 h compressive strength, MPa | 17 | 27 | 25 | 29 |

Table 4 shows that a relatively small amount of a polycarboxylate superplasticiser added imparts a higher slump value, thus a higher workability, than does a sulphonated naphtalene formaldehyde resin (NFS) superplasticiser. The NFS concrete composition requires a much higher superplasticiser dosage to attain a slump value not even as high as the polycarboxylate concrete composition. It is to be further remarked the improvement in compressive strength of the inventional concrete composition over the NFS concrete composition.

What is claimed is:

1. A concrete composition comprising a hydraulic binder, aggregates, water, silica sol and a superplasticiser, wherein the superplasticiser is a polycarboxylate.

2. The composition according to claim 1, wherein the silica sol has a specific surface area of from about 300 to about 1000 m$^2$/g.

3. The composition according to claim 1, wherein the silica sol has a specific surface area of from about 500 to about 900 m$^2$/g.

4. The composition according to claim 1, wherein the solid content of silica in the sol is from about 1 to about 70 wt %.

5. The composition according to claim 1, wherein the polycarboxylate molecular weight ranges from about 2000 to about 1 000 000 g/mole.

6. The composition according to claim 1, wherein the polycarboxylate comprises a backbone having a molecular weight ranging from about 5000 to about 20 000 g/mole.

7. The composition according to claim 1, wherein the polycarboxylate comprises grafted chains, linked to the polycarboxylate backbone, containing from about 50 to about 500 repetitive units.

8. The composition according to claim 1, wherein the polycarboxylate is present in an amount of from about 0.01 to about 3 wt % dry weight, calculated on the hydraulic binder.

9. The composition according to claim 1, wherein the molar ratio between carboxylic and sulphonic groups present in the polycarboxylate ranges from about 3 to about 5.

10. A method for preparing a concrete composition according to claim 1 comprising mixing a hydraulic binder, silica sol, aggregates, a superplasticiser and water, wherein the superplasticiser is a polycarboxylate.

11. The method according to claim 10, wherein the silica sol has a specific surface area of from about 500 to about 900 m$^2$/g.

12. The concrete composition according to claim 1 wherein the concrete composition is high fluidity concrete.

* * * * *